O. A. VICTEL.
VEHICLE SPRING AND SHOCK ABSORBER.
APPLICATION FILED MAY 16, 1913.
1,105,726.  Patented Aug. 4, 1914.
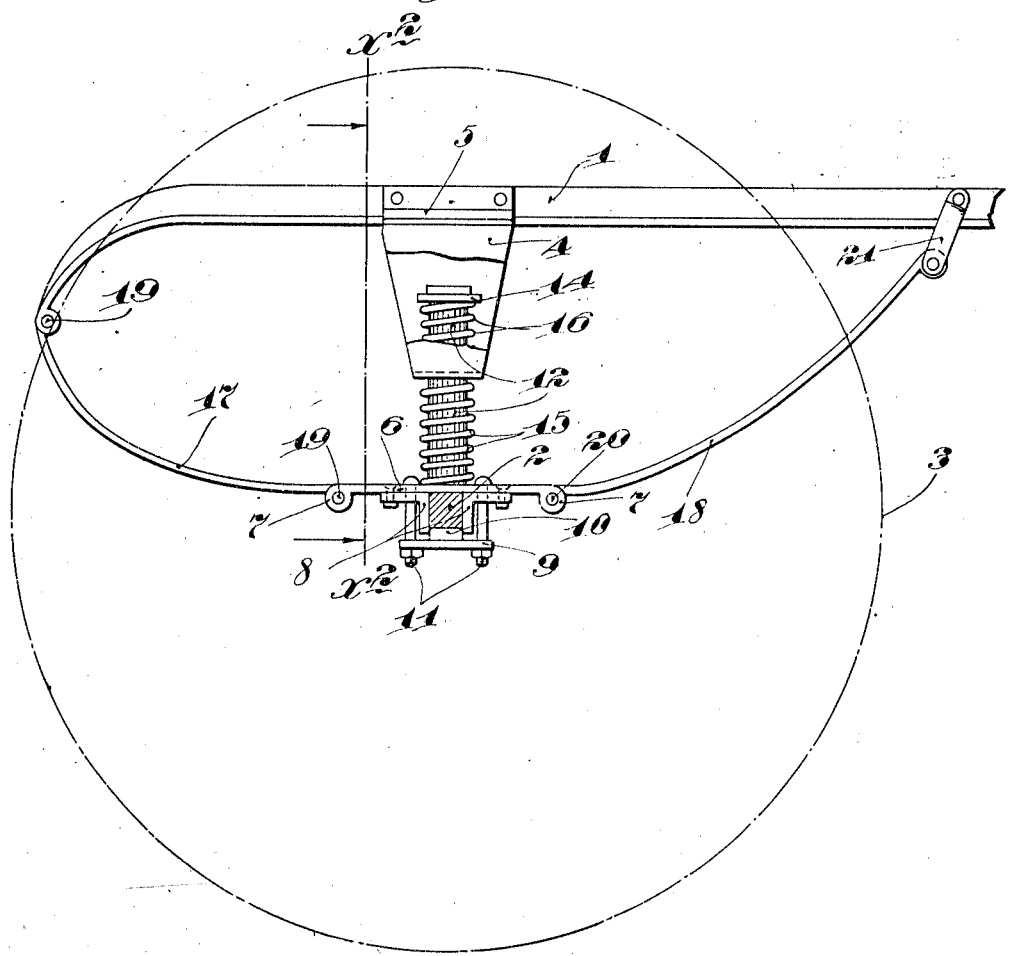
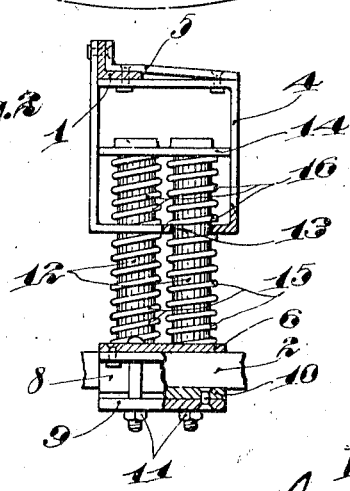
Witnesses:  Inventor:

UNITED STATES PATENT OFFICE.

OLAF A. VICTEL, OF GRANVILLE, NORTH DAKOTA.

VEHICLE SPRING AND SHOCK-ABSORBER.

1,105,726.   Specification of Letters Patent.   Patented Aug. 4, 1914.

Application filed May 16, 1913. Serial No. 768,056.

*To all whom it may concern:*

Be it known that I, OLAF A. VICTEL, a citizen of the United States, residing at Granville, in the county of McHenry and State of North Dakota, have invented certain new and useful Improvements in Vehicle Springs and Shock-Absorbers; and I do hereby declare the following to be a full, clear, and exact description of the invention, such as will enable others skilled in the art to which it appertains to make and use the same.

My invention has for its object to provide an improved spring for vehicles and, to this end, it consists of the novel devices and combinations of devices hereinafter described and defined in the claim.

In the accompanying drawings, which illustrate the invention, like characters indicate like parts throughout the several views.

Referring to the drawings: Figure 1 is a side view of the improved spring secured in working position to the running gear of an automobile, some parts being broken away, some parts being shown in section, and other parts being indicated in diagram; and Fig. 2 is a transverse vertical section, taken substantially on the line $x^2$ $x^2$ of Fig. 1.

In the drawings, the invention is shown applied in working position to the running gear of an automobile. The numeral 1 indicates one of the side bars of the automobile frame, and the numeral 2 indicates the front axle on which is journaled a wheel 3, shown in diagram.

Rigidly secured to and depending from the side bar 1 is a yoke 4 having its upper transverse portion reinforced by an L-shaped strap 5, secured to said yoke and the side bar 1. Resting on the axle 2, directly under the yoke 4, is a horizontally extended cap plate 6 having front and rear hinge lugs 7. On the under side of the cap plate 6 is a pair of laterally spaced angle pieces 8 that embrace the axle 2 and hold the cap plate 6 against transverse movement thereon. The cap plate 6 is frictionally clamped onto the axle 2 by a clamping plate 9 having on its upper face a filler block 10 extending between the depending horizontal edges of the angle pieces 8 and bearing against the under face of the axle 2. Nut equipped draw bolts 11 are passed through alined perforations in the cap plate 6, horizontal flanges of the angle pieces 8, and the clamping plate 9, for drawing the cap plate 6 and filler block 10 onto opposite sides of the axle 2.

A pair of upwardly projecting plungers 12 are secured, at their lower ends, to the cap plate 6, and their intermediate portions are slidably mounted in perforations 13 formed in the lower transverse portion of the yoke 4. These plungers 12 are laterally spaced, longitudinally of the axle 2, to give greater stability to the spring structure for resisting side strains of the vehicle. The upper ends of the plungers 12 are connected and held for straight line vertical movement by a follower 14, located within the yoke 4 and having sliding engagement with the vertical members thereof. Mounted on the plungers 12 are pairs of opposing coiled springs 15 and 16. The coiled springs 15 support the load of the vehicle and are compressed between the bottom of the yoke 4 and the cap plate 6. The springs 16 are compressed between the transverse portion of the yoke 4 and the follower 14 and act as shock absorbers during the recoil of the spring 15 on the rebound of the vehicle body. Front and rear hinge straps 17 and 18 are provided for holding the axle 2 against front and rear movements with respect to the side bar 1 and they also permit free vertical movements of the axle with respect to said side bar. The ends of the front strap 17 are pivotally secured, by hinge pins 19, to the side bar 1 and the front hinge lugs 7 of the cap plate 6. The front end of the rear hinge strap is pivotally secured to the rear hinge lugs 7 of the cap plate 6, by a hinge pin 20, and the rear end thereof is connected to the side bar 1 by a pair of laterally spaced swinging links 21.

What I claim is:

The combination with a vehicle frame and an axle, of a yoke on said frame, a cap plate secured to and resting on said axle, a pair of upwardly projecting plungers, rigidly secured at their lower ends to said cap plate, and working through the transverse portion of said yoke, said plungers being laterally spaced longitudinally of said axle, a follower connecting the upper ends of said plungers and working in said yoke, opposing pairs of coiled springs on said plungers, one pair of said springs being compressed between said axle and yoke, and the other pair thereof, being compressed between said follower and yoke, and a pair of oppositely
5 extended flexible connections, connecting said cap plate to said vehicle frame on opposite sides of said axle.

In testimony whereof I affix my signature in presence of two witnesses.

OLAF A. VICTEL.

Witnesses:
C. J. KROGFOSS,
NELS L. JOHNSON.